(12) United States Patent
Russell (10) Patent No.: US 9,286,653 B2
(45) Date of Patent: Mar. 15, 2016

(54) SYSTEM AND METHOD FOR INCREASING THE BIT DEPTH OF IMAGES

(71) Applicant: Google Inc., Mountain View, CA (US)

(72) Inventor: Andrew Ian Russell, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 36 days.

(21) Appl. No.: 14/452,790

(22) Filed: Aug. 6, 2014

(65) Prior Publication Data

US 2016/0042498 A1    Feb. 11, 2016

(51) Int. Cl.
| | |
|---|---|
| G06T 3/40 | (2006.01) |
| G06T 5/00 | (2006.01) |
| G06T 7/00 | (2006.01) |
| G06T 9/00 | (2006.01) |

(52) U.S. Cl.
CPC . *G06T 3/40* (2013.01); *G06T 5/002* (2013.01); *G06T 5/007* (2013.01); *G06T 7/0085* (2013.01); *G06T 9/00* (2013.01); *G06T 2207/20148* (2013.01); *G06T 2207/20182* (2013.01)

(58) Field of Classification Search
CPC ....... G06T 3/40; G06T 3/4023; G06T 3/4076; G06T 3/4084; G06T 5/002; G06T 5/02; G06T 5/007; G06T 7/0085; G06T 9/00; G06T 2207/20148; G06T 2207/20182
See application file for complete search history.

(56) References Cited

U.S. PATENT DOCUMENTS

| | | | |
|---|---|---|---|
| 4,924,310 A | | 5/1990 | von Brandt |
| 5,045,956 A | * | 9/1991 | Ejima ................ G11B 15/1875 360/51 |
| 5,049,990 A | * | 9/1991 | Kondo ................ H04N 19/98 358/1.9 |
| 5,148,269 A | | 9/1992 | de Haan et al. |
| 5,200,820 A | | 4/1993 | Gharavi |

(Continued)

FOREIGN PATENT DOCUMENTS

| | | |
|---|---|---|
| EP | 0634873 A2 | 1/1995 |
| EP | 1876823 A1 | 1/2008 |

(Continued)

OTHER PUBLICATIONS

Ahn et al., Flat-region Detection and False Contour Removal in the Digital TV Display, http://cilab.knu.ac.kr/seminar/Seminar/2012/20121013%20Flat-region%20Detection%20And%20False%20Contour%20Removal%20In%20The%20Digital%20TV%20Display.pdf, 2005.

(Continued)

*Primary Examiner* — Manav Seth
(74) *Attorney, Agent, or Firm* — Young Basile Hanlon & MacFarlane P.C.

(57) ABSTRACT

A method for processing an image having a first bit depth includes performing two or more iterations of a bit depth enhancement operation that increases the bit depth of the image to a second bit depth that is higher than the first bit depth. The bit depth enhancement operation includes dividing the image into a plurality of areas, performing an edge detection operation to identify one or more areas from the plurality of areas that do not contain edge features, and applying a blur to the one or more areas from the plurality of areas that do not contain edge features. In a first iteration of the of the bit depth enhancement operation, the plurality of areas includes a first number of areas, and the number of areas included in the plurality of areas decreases with each subsequent iteration of the bit depth enhancement operation.

21 Claims, 6 Drawing Sheets

(56) References Cited

U.S. PATENT DOCUMENTS

| | | | |
|---|---|---|---|
| 5,337,086 A | 8/1994 | Fujinami | |
| 5,398,068 A | 3/1995 | Liu et al. | |
| 5,473,384 A * | 12/1995 | Jayant | H04N 19/63 |
| | | | 348/470 |
| 5,487,172 A * | 1/1996 | Hyatt | B60R 16/0373 |
| | | | 700/8 |
| 5,512,952 A | 4/1996 | Iwamura | |
| 5,612,900 A * | 3/1997 | Azadegan | G11B 27/031 |
| | | | 375/E7.088 |
| 5,701,160 A | 12/1997 | Kimura et al. | |
| 5,731,840 A | 3/1998 | Kikuchi et al. | |
| 5,739,862 A | 4/1998 | Cen | |
| 5,838,828 A | 11/1998 | Mizuki et al. | |
| 5,883,975 A | 3/1999 | Narita et al. | |
| 5,886,742 A | 3/1999 | Hibi et al. | |
| 5,929,919 A | 7/1999 | De Haan et al. | |
| 5,991,447 A | 11/1999 | Eifrig et al. | |
| 6,005,980 A | 12/1999 | Eifrig et al. | |
| 6,058,141 A | 5/2000 | Barger et al. | |
| 6,108,448 A | 8/2000 | Song et al. | |
| 6,115,070 A | 9/2000 | Song et al. | |
| 6,128,341 A | 10/2000 | Kwak | |
| 6,219,043 B1 * | 4/2001 | Yogeshwar | G11B 27/034 |
| | | | 341/55 |
| 6,236,683 B1 | 5/2001 | Mougeat et al. | |
| 6,272,179 B1 | 8/2001 | Kadono | |
| 6,289,049 B1 | 9/2001 | Kim et al. | |
| 6,359,929 B1 | 3/2002 | Boon | |
| 6,381,277 B1 | 4/2002 | Chun et al. | |
| 6,385,245 B1 | 5/2002 | De Haan et al. | |
| 6,449,312 B1 | 9/2002 | Zhang et al. | |
| 6,735,249 B1 | 5/2004 | Karczewicz et al. | |
| 6,839,386 B2 | 1/2005 | Sato et al. | |
| 6,927,804 B2 | 8/2005 | Adams, Jr. et al. | |
| 6,956,898 B1 | 10/2005 | Podilchuk et al. | |
| 7,003,174 B2 | 2/2006 | Kryukov et al. | |
| 7,054,367 B2 | 5/2006 | Oguz et al. | |
| 7,071,902 B1 * | 7/2006 | Kawahara | G09G 3/2022 |
| | | | 345/60 |
| 7,084,906 B2 | 8/2006 | Adams, Jr. et al. | |
| 7,133,070 B2 | 11/2006 | Wheeler et al. | |
| 7,158,668 B2 | 1/2007 | Munsil et al. | |
| 7,346,109 B2 | 3/2008 | Nair et al. | |
| 7,440,619 B2 | 10/2008 | Mishima et al. | |
| 7,474,355 B2 | 1/2009 | Leone et al. | |
| 7,483,577 B2 | 1/2009 | Xin et al. | |
| 7,620,107 B2 | 11/2009 | Lee et al. | |
| 7,671,922 B2 | 3/2010 | Leone et al. | |
| 7,672,022 B1 * | 3/2010 | Fan | G06T 7/0083 |
| | | | 348/207.99 |
| 7,724,307 B2 | 5/2010 | Wan et al. | |
| 7,804,901 B2 | 9/2010 | Molloy | |
| 7,961,960 B2 * | 6/2011 | Bashyam | G06F 17/30153 |
| | | | 382/232 |
| 7,978,770 B2 | 7/2011 | Luo et al. | |
| 8,023,749 B2 | 9/2011 | Nakayama | |
| 8,111,754 B1 | 2/2012 | Demos | |
| 8,184,200 B1 | 5/2012 | Biswas et al. | |
| 8,335,105 B2 | 12/2012 | Wang et al. | |
| 8,422,546 B2 | 4/2013 | Lin et al. | |
| 8,520,039 B2 * | 8/2013 | Inokawa | G09G 3/20 |
| | | | 345/158 |
| 8,593,692 B2 | 11/2013 | Chen et al. | |
| 8,908,984 B2 | 12/2014 | Carmel et al. | |
| 8,995,525 B2 * | 3/2015 | Wiegand | H04N 19/593 |
| | | | 375/240.02 |
| 9,153,017 B1 | 10/2015 | Russell et al. | |
| 2001/0021268 A1 | 9/2001 | Bae et al. | |
| 2002/0031272 A1 | 3/2002 | Bagni et al. | |
| 2002/0176506 A1 | 11/2002 | Ferreira Florencio et al. | |
| 2003/0012280 A1 | 1/2003 | Chan | |
| 2003/0053708 A1 | 3/2003 | Kryukov et al. | |
| 2003/0086498 A1 | 5/2003 | Lee et al. | |
| 2003/0128762 A1 | 7/2003 | Nakagawa et al. | |
| 2004/0022419 A1 | 2/2004 | Kesaniemi | |
| 2004/0071313 A1 | 4/2004 | Hahn et al. | |
| 2004/0100565 A1 * | 5/2004 | Chen | G06T 3/4038 |
| | | | 348/229.1 |
| 2004/0227758 A1 | 11/2004 | Curry et al. | |
| 2005/0122294 A1 * | 6/2005 | Ben-David | G09G 3/2003 |
| | | | 345/87 |
| 2005/0201463 A1 | 9/2005 | Lee et al. | |
| 2005/0201627 A1 | 9/2005 | Liang et al. | |
| 2006/0045184 A1 | 3/2006 | Vetro et al. | |
| 2006/0072672 A1 | 4/2006 | Holcomb et al. | |
| 2006/0153301 A1 | 7/2006 | Guleryuz | |
| 2006/0209963 A1 | 9/2006 | Valente | |
| 2006/0242581 A1 | 10/2006 | Manion et al. | |
| 2007/0019729 A1 | 1/2007 | Nakagomi et al. | |
| 2007/0076795 A1 | 4/2007 | Lee | |
| 2007/0076959 A1 | 4/2007 | Bressan | |
| 2007/0081193 A1 * | 4/2007 | Lee | G06T 3/40 |
| | | | 358/3.27 |
| 2007/0086161 A1 | 4/2007 | Hartung | |
| 2007/0292036 A1 | 12/2007 | Nakayama | |
| 2008/0008243 A1 | 1/2008 | Ozdemir | |
| 2008/0152235 A1 * | 6/2008 | Bashyam | G06F 17/30153 |
| | | | 382/224 |
| 2008/0170623 A1 | 7/2008 | Aharon et al. | |
| 2008/0192825 A1 | 8/2008 | Lee et al. | |
| 2008/0239335 A1 * | 10/2008 | Lee | H04N 19/176 |
| | | | 358/1.6 |
| 2008/0285656 A1 | 11/2008 | Au et al. | |
| 2008/0291997 A1 | 11/2008 | Yoon et al. | |
| 2009/0122867 A1 | 5/2009 | Mauchly et al. | |
| 2009/0167778 A1 | 7/2009 | Wei | |
| 2009/0180538 A1 | 7/2009 | Visharam et al. | |
| 2009/0180554 A1 | 7/2009 | Jang et al. | |
| 2009/0323666 A1 | 12/2009 | Malladi et al. | |
| 2010/0053451 A1 | 3/2010 | Seong et al. | |
| 2010/0067817 A1 * | 3/2010 | Winger | G06K 9/40 |
| | | | 382/256 |
| 2010/0091194 A1 | 4/2010 | Lei et al. | |
| 2010/0283892 A1 | 11/2010 | Zhou et al. | |
| 2010/0289816 A1 | 11/2010 | Au et al. | |
| 2010/0315550 A1 | 12/2010 | Yokoyama | |
| 2011/0007979 A1 | 1/2011 | Goma | |
| 2011/0057970 A1 * | 3/2011 | Inokawa | G09G 3/20 |
| | | | 345/698 |
| 2011/0069237 A1 * | 3/2011 | Wang | H04N 5/145 |
| | | | 348/699 |
| 2011/0090959 A1 * | 4/2011 | Wiegand | H04N 19/593 |
| | | | 375/240.12 |
| 2012/0063681 A1 | 3/2012 | Sandrew et al. | |
| 2012/0154370 A1 | 6/2012 | Russell et al. | |
| 2013/0057644 A1 | 3/2013 | Stefanoski et al. | |
| 2013/0170767 A1 * | 7/2013 | Choudhury | G06T 3/4053 |
| | | | 382/260 |
| 2013/0198152 A1 | 8/2013 | McGhee et al. | |
| 2013/0223733 A1 | 8/2013 | Tripathi et al. | |
| 2013/0257851 A1 | 10/2013 | Lee et al. | |
| 2013/0314442 A1 | 11/2013 | Langlotz et al. | |
| 2014/0294320 A1 | 10/2014 | Kokaram et al. | |

FOREIGN PATENT DOCUMENTS

| | | |
|---|---|---|
| EP | 2144432 A1 | 1/2010 |
| EP | 2557789 A2 | 2/2013 |
| WO | WO2005088975 A1 | 9/2005 |
| WO | WO2012035533 A2 | 3/2012 |

OTHER PUBLICATIONS

Ahn et al., Flat-region Detection and False Contour Removal in the Digital TV Display, http://www.cecs.uci.edu/~papers/icme05/defevent/papers/cr1737.pdf., 2005.

Daly et al., Decontouring: Prevention and Removal of False Contour Artifacts, from Conference vol. 5292, Human Vision and Electronic Imaging IX, Jun. 7, 2004.

FFmpeg, gradfun.h File Reference, Data Structures, https://www.ffmpeg.org/doxygen/trunk/gradfun__8h.html, retrieved Jul. 21, 2014.

Xu, Li, Jianing Chen, and Jiaya Jia. A segmentation based variational model for accurate optical flow estimation. Computer Vision-ECCV 2008. Springer Berlin Heidelberg, 2008. 671-684.

(56) References Cited

OTHER PUBLICATIONS

Zhang, Kui, et al.; "Variable Block Size Video Coding With Motion Prediction and Motion Segmentation", SPIE vol. 2419, 1995, 9 pp.
Zhao, Jie, and Andrew Segall, "Parallel Prediction Unit for Parallel Intra Coding", Joint Collaborative Team on Video (JTC-VC) of ITU-T SG16 WP3 and ISO/IEC JTC1/SC29?WG11, @nd Meeting: Geneva, CH Jul. 21-28, 2010.
Baccichet, Pierpaolo, Shantanu Rane, Antonio Chimienti and Bernd Girod, "Robust Low-Delay Video Transmission Using H.264/AVC Redundant Slices and Flexible Macroblock Ordering," IEEE International ConferexNCe on Image Processing, ICIP 2007.
Bankoski et al. "Technical Overview of VP8, An Open Source Video Codec for the Web". Dated Jul. 11, 2011.
Bankoski et al. "VP8 Data Format and Decoding Guide" Independent Submission. RFC 6389, Dated Nov. 2011.
Bankoski et al. "VP8 Data Format and Decoding Guide; draft-bankoski-vp8-bitstream-02" Network Working Group. Internet-Draft, May 18, 2011, 288 pp.
Chen, Michael C., et al.; "Design and Optimization of a Differentially Coded Variable Block Size Motion Compensation System", IEEE 1996, 4 pp.
Chen, Xing C., et al.; "Quadtree Based Adaptive Lossy Coding of Motion Vectors", IEEE 1996, 4 pp.
Dalal et al., "Histograms of oriented gradients for human detection", Computer vision and Pattern Recognition, vol. 1, pp. 886-893, Jun. 25, 2005.
Dhondt, Yves, Peter Lambert, Stijn Notebaert, and Rik Van de Walle, "Flexible macroblock ordering as a content adaptation tool in H.264/AVC", Multimedia Systems and Applications VIII, edited by Anthony Vetro, Chang Wen Chen, C-C. J. Kuo, Tong Zhang, Qi Tian, John R Smith, Proc. of Spie vol. 6015, 601506-1 (2005).
Ebrahimi, Touradj, et al.; "Joint motion estimation and segmentation for very low bitrate video coding", SPIE vol. 2501, 1995, 12 pp.
Fang et al., "A New Adaptive Subpixel-based Downsampling Scheme Using Edge Detection", pp. 3194-3197, ISCAS, 14-27, 2009.
Guillotel, Philippe, et al.; "Comparison of motion vector coding techniques", SPIE vol. 2308, 1994, 11 pp.
Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
ISR and Written Opinion of the International Searching Authority, for Int'l Application No. PCT/US2011/066345; Mar. 30, 2012.
ISR for related application PCT/US2014/032207 mailed Jul. 7, 2014 (894APCT).
Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.
Kim, Jong Won, et al.; "On the Hierarchical Variable Block Size Motion Estimation Technique for Motion SequexNCe Coding", SPIE Visual Communication and Image Processing 1993, Cambridge, MA, Nov. 8, 1993, 29 pp. (Abstract only).
Krishnamurthy et al. Frame Interpolation and Bidirectional Prediction of Video Using Compactly ExNCoded Optical-Flow Fields and Label Fields, IEEE Transactions on Circuits and Systems for video Technology, vol. 9, No. 5, Aug. 1, 1999.
Le, Sung-Hee, Ohjae Kwon, and Rae-Hong Park. Weighted-adaptive motion-compensated frame rate up-conversion. Consumer Electronics, IEEE Transations on 49.3 (2003): 485-592.
Liu, Bede, et al.; "A simple method to segment motion field for video coding", SPIE vol. 1818, Visual Communications and Image Processing 1992, 10 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.
Martin, Graham R., et al.; "Reduced Entropy Motion Compensation Using Variable Sized Blocks", SPIE vol. 3024, 1997, 10 pp.
Mozilla, "Introduction to Video Coding Part 1: Transform Coding", Video Compression Overview, Mar. 2012, 171 pp.
Nicolas, H., et al.; "Region-based motion estimation using deterministic relaxation schemes for image sequexNCe coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
Ojo et al., "Robust Motion-Compensated Video Upconversation" IEEE Transactions on Consumer Electronics, vol. 43, No. 4, Nov. 1, 1997, pp. 1045-1056.
Orchard, Michael T.; "Exploiting Scene Structure in Video Coding", IEEE 1991, 5 pp.
Orchard, Michael T.; "Predictive Motion-Field Segmentation for Image SequexNCe Coding", IEEE Transactions on Circuits and Systems for Video Technology, vol. 3, No. 1, Feb. 1993, 17 pp.
Overview; VP7 Data Format and Decoder. Version 1.5. On2 Technologies, IxNC. Dated Mar. 28, 2005.
Schiller, H., et al.; "Efficient Coding of Side Information in a Low Bitrate Hybrid Image Coder", Signal Processing 19 (1990) Elsevier SciexNCe Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
VP6 Bitstream & Decoder Specification. Version 1.02. On2 Technologies, IxNC. Dated Aug. 17, 2006.

(56) References Cited

OTHER PUBLICATIONS

VP6 Bitstream & Decoder Specification. Version 1.03. On2 Technologies, IxNC. Dated Oct. 29, 2007.
VP8 Data Format and Decoding Guide. WebM Project. Google On2. Dated: Dec. 1, 2010.
Wiegand T. et al., Thomas, Gary J. Sullivan, Gisle Bjontegaard, and Ajay Luthra, "Overview of the H.264/AVC Video Coding Standard" IEEE Transactions on Circuits and Systems for Video Technology, vol. 13, No. 7, Jul. 2003.
Wiegand, Thomas, et al.; Long-Term Memory Motion-Compensated Prediction, date unknown, Feb. 1999.
Wikipedia contributors, "Chroma subsampling", webpage, last updated Jun. 3, 2014, pp. 1-8, http://en.wikipedia.org/wiki/Chroma_subsampling.
Wright, R. Glenn, et al.; "Multimedia—Electronic Technical Manual for ATE", IEEE 1996, 3 pp.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Bhagavathy S. et al., Multiscale Probabilistic Dithering for Suppressing Contour Artificats in Digital Images, IEEE Transactions on Image Processing, vol. 18, No. 9, Sep. 1, 2009, pp. 1936-1945.
Chan, G., Towards Better Chroma Subsampling, SMPTE Motion Imaging Journal, Jun. 30, 2008, pp. 39-45.
International Search Report & Written Opinion, RE: Application # PCT/US2015/042322; in related matter, mailed Nov. 4, 2015.
International Search Search Report & Written Opinion, RE: Application #PCT/US2015/042323; in related matter, Nov. 20, 2015.
Jing, Ni et al., False Contour Suppression with Anisotropic Adaptive Filtering, Journal of Image and Graphics, XX, CN, vol. 19, No. 2, Feb. 1, 2014, pp. 219-225.
Lee, J. W. et al., Two-stage False Contour Detection Using Directional Contrast and its Application to Adaptive False contour Reduction, IEEE Transactions on Consumer Electronics, vol. 52, No. 1, Feb. 1, 2006, pp. 179-188.

* cited by examiner

SYSTEM AND METHOD FOR INCREASING THE BIT DEPTH OF IMAGES

BACKGROUND

Digital images and videos are represented by pixels that each have a color value. The number of colors that can be utilized to represent an individual pixel is a function of the number of bits utilized to describe the color. Increasing the number of bits used to represent colors increases the number of colors that can be represented. This is referred to as bit depth.

Images are often stored and/or transmitted at a color bit depth of eight bits per pixel per color. When viewed on displays having high resolution and high contrast, objectionable visual artifacts become noticeable as a result of the color bit depth. A common and very noticeable visual artifact is referred to as "banding" or "false contouring," which occurs when and area of an image that should be a smooth, gradual transition between colors (i.e. a gradient), is instead represented by bands of color with noticeable borders between them. These artifacts can be eliminated by storing images and video at a higher bit depth, where the color value of each pixel is represented by more bits. Many previously recorded images are, however, already stored at low bit depths, such as eight bits per pixel per color. In addition, increasing the bit depth of an image causes a corresponding increase in the space required to store the image and the amount of data that must be transmitted in order to send the image over a network.

SUMMARY

This disclosure relates in general to increasing bit depth in images and videos.

One aspect of the disclosed embodiments is a method for processing an image having a first bit depth. The method includes performing two or more iterations of a bit depth enhancement operation that increases the bit depth of the image to a second bit depth that is higher than the first bit depth. The bit depth enhancement operation includes dividing the image into a plurality of areas, performing an edge detection operation to identify one or more areas from the plurality of areas that do not contain edge features, and applying a blur to the one or more areas from the plurality of areas that do not contain edge features. In a first iteration of the of the bit depth enhancement operation, the plurality of areas includes a first number of areas, and the number of areas included in the plurality of areas decreases with each subsequent iteration of the bit depth enhancement operation.

Another aspect of the disclosed embodiments is an apparatus for processing an image having a first bit depth. The apparatus includes a memory and a processor configured to execute instructions stored in the memory to perform two or more iterations of a bit depth enhancement operation that increases the bit depth of the image to a second bit depth that is higher than the first bit depth. The bit depth enhancement operation includes dividing the image into a plurality of areas, performing an edge detection operation to identify one or more areas from the plurality of areas that do not contain edge features, and applying a blur to the one or more areas from the plurality of areas that do not contain edge features. In a first iteration of the of the bit depth enhancement operation, the plurality of areas includes a first number of areas, and the number of areas included in the plurality of areas decreases with each subsequent iteration of the bit depth enhancement operation.

Another aspect of the disclosed embodiments is a non-transitory computer-readable storage device including program instructions executable by one or more processors that, when executed, cause the one or more processors to perform operations for processing an image having a first bit depth. The operations include performing two or more iterations of a bit depth enhancement operation that increases the bit depth of the image to a second bit depth that is higher than the first bit depth. The bit depth enhancement operation includes dividing the image into a plurality of areas performing an edge detection operation to identify one or more areas from the plurality of areas that do not contain edge features, and applying a blur to the one or more areas from the plurality of areas that do not contain edge features. In a first iteration of the of the bit depth enhancement operation, the plurality of areas includes a first number of areas, and the number of areas included in the plurality of areas decreases with each subsequent iteration of the bit depth enhancement operation.

BRIEF DESCRIPTION OF THE DRAWINGS

The description herein makes reference to the accompanying drawings wherein like reference numerals refer to like parts throughout the several views, and wherein.

DETAILED DESCRIPTION

The systems and methods described herein are directed to increasing the bit depth of digital images by applying a threshold-based blur at multiple scales. By applying a blur at multiple scales, the size of the blur is automatically determined. By applying a threshold at each scale, the need for explicitly segmenting an image based on its contents is avoided. Each blurring operation and thresholding operation can be applied separately to discrete areas of the image, such as groups of pixels, to localize the effects of the blurring and to maintain edge features. Optionally, a filtering operation can be applied using an offset copy of the image to ensure smooth interpolation.

Figure 1:
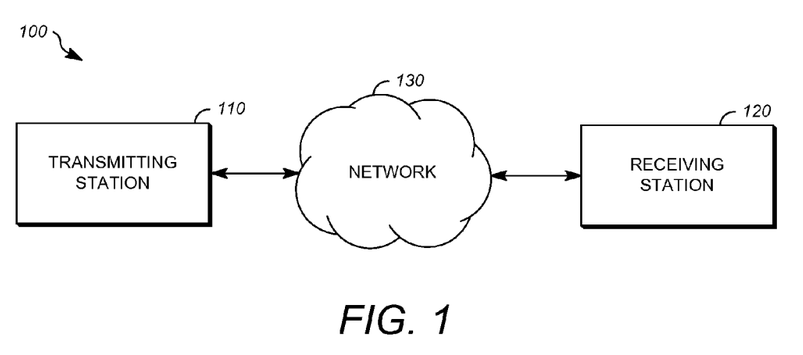
FIG. 1 is a block diagram showing an example of an environment in which a system for increasing the color bit depth of images can be implemented.

FIG. 1 is a block diagram showing an example of an environment 100 in which a system for increasing the bit depth of images can be implemented. The environment 100 includes a transmitting station 110 and a receiving station 120 that are connected by a network 130. The transmitting station 110 and the receiving station 120 can be implemented in many ways, such as in the form of one or more computing devices having a memory and a processor. The network 130 can be or include any or all of the Internet, a local area network (LAN), wide area network (WAN), virtual private network (VPN), cellular telephone network or any other means of transferring information from the transmitting station 110 to the receiving station 120.

The receiving station 120 is operable to increase the bit depth of images by processing them according to the methods taught herein. The images can then be output for display to a user at the receiving station 120. As used herein, images can be individual still images such as digital photographs, or frames from a video.

In one implementation, the images that are processed by the receiving station 120 are transmitted from the transmitting station 110 to the receiving station 120 via the network, and are processed by the receiving station 120 after they are received. For example, the images can be frames from a video stream. In response to a request from the receiving station 120, the transmitting station 110 can transmit the video stream to the receiving station. In some implementations, the video stream is encoded by the transmitting station 110 prior to transmission. In other implementations, the video stream has been previously encoded and stored at the transmitting station. The video stream is encoded at a first color bit depth. After receiving the video stream and encoding the video stream, the receiving station processes images (i.e. frames) from the video stream according to the methods taught herein in order to increase the bit depth of the images.

Figure 2:
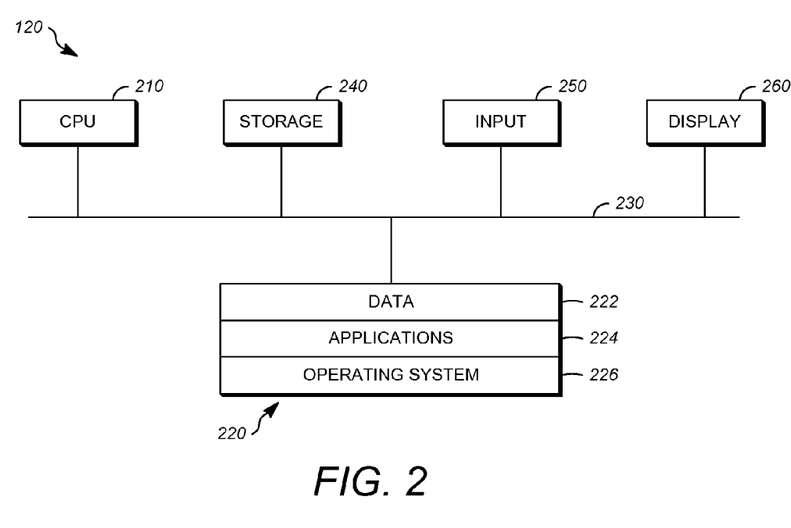
FIG. 2 is a block diagram showing an example of a hardware configuration for a receiving station.

FIG. 2 is a block diagram of an example of a hardware configuration for the receiving station 120 of FIG. 1. The same hardware configuration or a similar hardware configuration can be used to implement the transmitting station 110. The receiving station 120 can include a CPU 210. The CPU 210 can be a conventional central processing unit. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

The receiving station 120 can include memory 220, such as a random access memory device (RAM). Any other suitable type of storage device can also be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described here.

A storage device 240 can be optionally provided in the form of any suitable computer readable medium, such as a hard disc drive, a memory device, a flash drive, or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as a liquid crystal display (LCD) or a cathode-ray tube (CRT), allows output to be presented to a user, for example, in response to receiving a video signal.

Although FIG. 2 depicts the CPU 210 and the memory 220 of the receiving station 120 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of the receiving station 120 can be composed of multiple buses. Further, the storage device 240 can be directly coupled to the other components of the receiving station 120 or can be accessed via a network and can comprise a single integrated unit such as a memory card or multiple units such as multiple memory cards. The receiving station 120 can thus be implemented in a wide variety of configurations.

Figure 3:
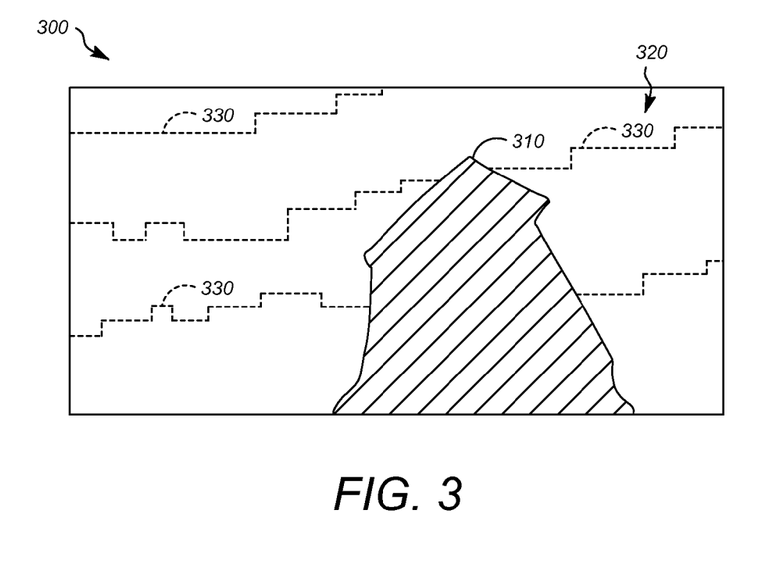
FIG. 3 is an illustration showing an example of an input image.

FIG. 3 is an illustration showing an example of an input image 300 that can be processed using the systems and methods disclosed herein. The input image 300 is a digital image that is defined by pixels, as is well known in the art. Each pixel has a color value that defines the color of the respective pixel when it is output for display. Each color value can be defined by multiple component values, for example, as in well-known color spaces such as the RGB color space, the YUV color space, the HSV color space, and the HSL color space, which can represent pixels as tuples of component values.

The input image 300 includes high detail areas 310 and low detail areas 320. The high detail areas 310 are portions of the input image that include significant variations in neighboring pixel values. These variations are referred to herein as edge features. The low detail areas 320 of the input image include subtle variations in their color values, for example, a gradual and progressive change in color values (e.g. a gradient). For instance, the high detail areas 310 might be the foreground portions of a particular image, where features in the image are close and in focus, while the low detail areas 320 are background portions of the image.

The input image 300 can be stored at a low color bit depth, such as a color bit depth of eight bits per pixel per color. This can lead to the number of available colors being inadequate to represent the subtle variations of color that would naturally be present in the image. Instead, visual artifacts such as false contours 330 may be visible in the image when it is output for display, such that a viewer of the image may be able to perceive visible transitions from one color value to the next in the low detail areas 320.

Figure 4:
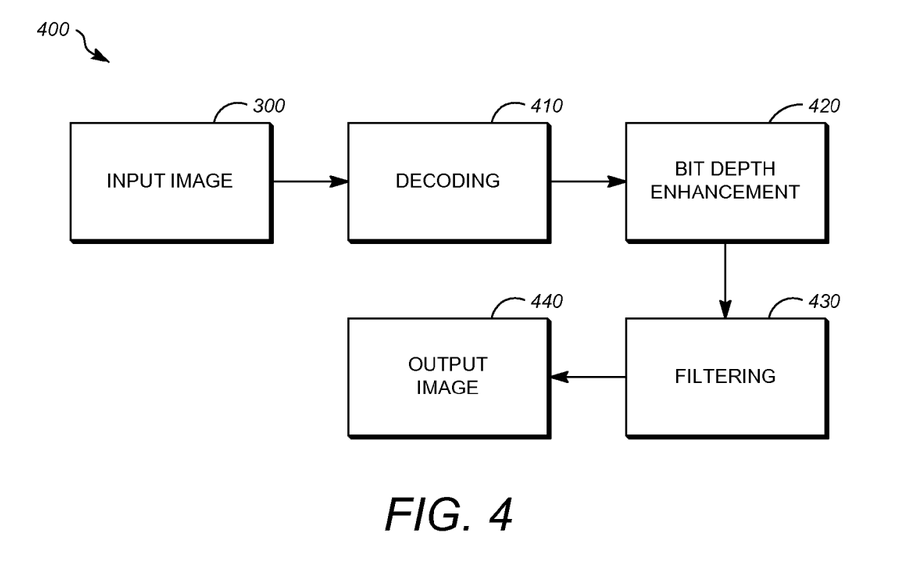
FIG. 4 is a block diagram showing operation of the system for increasing the color bit depth of images.

FIG. 4 shows operation of a system 400 for increasing the color bit depth of images. The system 400 receives the input image 300 as its input and generates an output image 440 as its output. The system 400 can be implemented, for example, as the receiving station 120 by execution of computer program instructions by the receiving station 120.

Initially, the input image 300 can be encoded in according to a video or still image format or any type. The input image 300 is received as an input at a decoding subsystem 410 that decodes the input image into pixel values in any suitable form, as is well known in the art. As examples, the pixel values can be in RGB format or YUV format.

The pixel values representing the input image 300 are then passed to a bit depth enhancement subsystem 420. The bit depth enhancement subsystem increases the bit depth of the input image 300 from a first bit depth to a second bit depth that is higher than the first bit depth.

The bit depth enhancement subsystem 420 is operable to increase the color bit depth of the input image 300 by applying a blur at multiple scales but without a predetermined size. Instead, the size of the blur is determined dynamically by detecting edge features in the input image 300. For example, for each of several progressively larger blur sizes, the image can be divided into areas, areas that contain edge features are not blurred in order to retain the edge features, and areas that do not contain edge features are blurred. In one example, blurring is performed within an area of an image by averaging the pixel values within the area, and setting all of the pixels to the average value or modifying all of the pixel values based on the average value. Within areas lacking edge features, the blurring operations cause the pixel values of the input image to change to color values that were not available at the original color bit depth of the image, thereby increasing the amount of color information in the image.

In one implementation, the bit depth enhancement subsystem performs two or more iterations of a bit depth enhancement operation by dividing the image into a plurality of areas, performing an edge detection operation to identify one or more areas from the plurality of areas that do not contain edge features, and applying a blur to the one or more areas from the plurality of areas that do not contain edge features. In a first iteration of the of the bit depth enhancement operation, the plurality of areas includes a first number of areas, and the number of areas decreases with each subsequent iteration of the bit depth enhancement operation. The number of areas can be decreased by increasing the pixel-wise size of the areas, or by maintaining a constant pixel-wise size for the areas while downscaling the image with each iteration. When multiple images are created at different scales, they are subsequently upscaled and combined, with areas in the combined image taken from the image at the largest scale at which edge features were identified in the respective area.

A filtering subsystem 430 can filter the image to remove visual artifacts, if any, that may be created by the bit depth enhancement subsystem 420. The filtering subsystem 430 can performed a filtering operation subsequent to the processing performed by the bit depth enhancement subsystem 420 or in parallel with the processing performed by the bit depth enhancement subsystem 420 by applying filtering at each of the progressively larger blur sizes. In one example of the filtering operation applied by the filtering subsystem 430, each blurring step applied by the bit depth enhancement subsystem 420 is performed with respect to the a first copy of the image and a second copy of the image that has been offset by a one-pixel diagonal shift. The two copies of image are then averaged to generate the output image 440. Other filtering methods can be utilized to generate the output image 440. In some implementations, the filtering subsystem 430 is omitted and the output image 440 is generated by the bit depth enhancement subsystem 420 without filtering.

Figure 5:
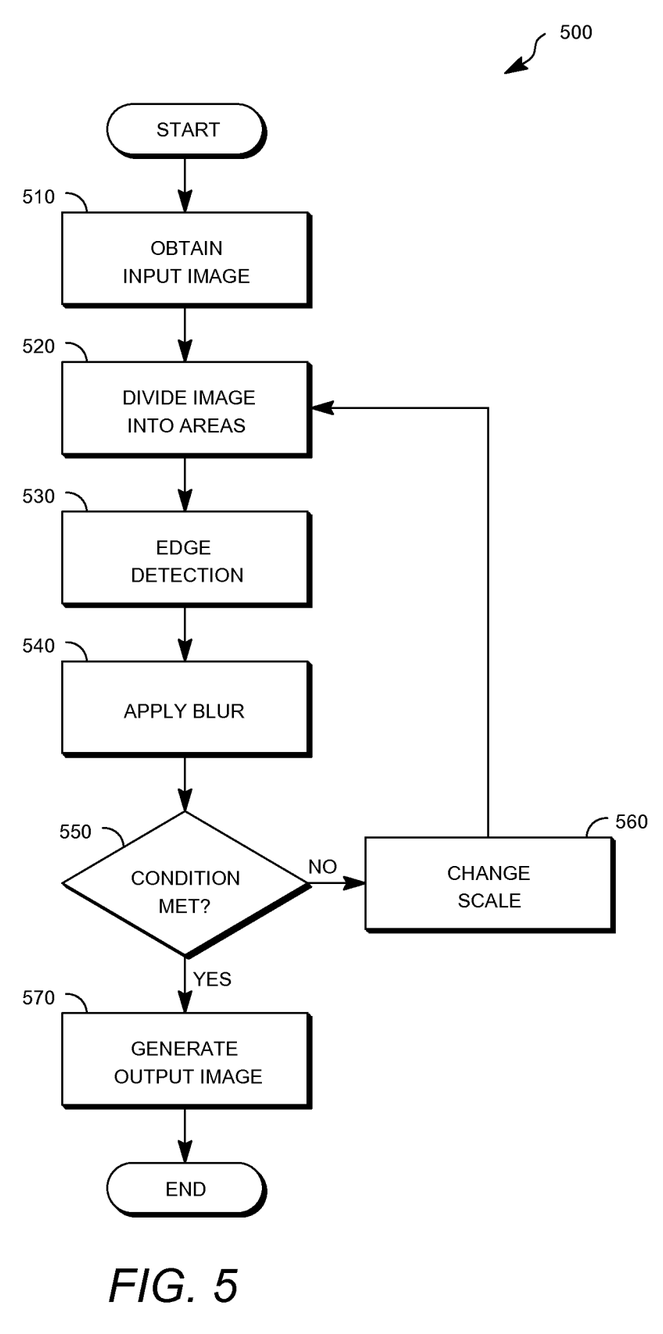
FIG. 5 is a flowchart showing an example process for increasing the color bit depth of images.

FIG. 5 is a flowchart showing a first example of a process 500 for increasing the color bit depth of images. The operations described in connection with the process 500 can be performed at one or more computers, such as at receiving station 120. When an operation is described as being performed by one or more computers, it is completed when it is performed by one computer working alone, or by multiple computers working together. The operations described in connection with the process 500 can be embodied as a non-transitory computer readable storage medium including program instructions executable by one or more processors that, when executed, cause the one or more processors to perform the operations. For example, the operations described in connection with the process 500 could be stored at the memory 220 of one of the receiving station 120 and be executable by the CPU 210 thereof.

Operation 510 includes obtaining an input image, such as the input image 300. The input image can be obtained, for example, by accessing the image from memory, accessing the image from a storage device, or receiving the image via a network transmission such as a transmission from the transmitting station 110 to the receiving station 120 via the network 130. If necessary, the image can be decoded to obtain pixel values for the image.

After operation 510, a first iteration of an image processing subprocess begins, starting with operation 520 and also including operations 530, 540, 550, and 560. In the first iteration of the image processing subprocess, a blur will be applied at a first scale. In each iteration of the subprocess, the scale of the blur is changed.

In operation 520, the image is divided into a plurality of areas. The scale of the blur is controlled by dividing the image into areas in operation 520. The image is divided based on an initial scale for the first iteration, and at a changed scale for subsequent iterations, as will be explained further herein.

In operation 530, an edge detection operation is performed to identify high detail and low detail regions of the image. The edge detection operation can be applied individually to each of the areas defined in operation 520. Thus, the edge detection operation can determine, for each of the areas defined in operation 520, whether that respective area contains edge features. The edge detection operation is affected by the size of the areas defined in operation 520. In particular, the size of the areas (relative to the original size of the image) increases in each iteration. As the areas increase in size, the likelihood of finding an edge in each are also increases. The result, as will be explained further herein, is that in each iteration, the strength of the blur is increased, but the area of the image being affected by the blur decreases.

In one example, each area from the plurality of areas includes a plurality of pixels each having a pixel value and the edge detection operation includes comparing a maximum pixel value in each area to a minimum pixel value in each area. In this example, an edge feature is identified as being present within a respective area of the image when the difference between the maximum pixel value and the minimum pixel value in a respective area from the plurality of areas exceeds a threshold value. For example, the threshold value could be one, such that edges are considered to be present if there is a difference of more than one color shade with respect to the original color bit depth of the input image. Other methods of detecting edges are known and can be utilized in operation 530.

The results of the edge detection operation are stored for later use. For example, a value such as one or zero can be assigned to each area to indicate whether edge features are present in the area. In one implementation, these values are stored as an edge map in the form of a matrix of values that each represent an corresponding area of the image, with positions in the matrix corresponding spatially to locations in the image. Also, the edge map can be stored for each iteration of the image processing sub process, such that the edge maps from each iteration of the image processing subprocess are available for use subsequent to conclusion of the image processing subprocess.

In operation 540 a blur is applied. The scale of the blur is defined by the areas defined in operation 520. In one example, each area from the plurality of areas defined at operation 520 includes a plurality of pixels each having a pixel value, and applying the blur at operation 540 is performed by determining an average value based on all of the pixel values in the respective area and setting all of the pixel values in the area to the average pixel value.

The blur is applied to the low detail regions of the image, such as one or more areas that do not contain edge features. The blur can be applied based on the edge features detected at operation 530, by blurring all of the areas of the image that do not contain edge features. In one implementation, only those areas of the image that do not contain edge features are blurred, and the area of the image that contain edge features are not blurred. In another implementation, the entire image is blurred, but applied only to low detail regions of the image by subsequent use of the edge map for its respective iteration of the image enhancement subprocess during generation of the output image.

In operation 550, a determination is made as to whether a condition is met. Meeting the condition indicates that a suitable number of iterations of the image enhancement subprocess have been performed, and that no more iterations need be completed. In one example, the condition is met when a predetermined number of iterations have been performed. In another example, the number of iterations to be performed is calculated. As an example, the number of iterations could be determined based on the size of the image, an initial size for the areas, and the number of times that the areas can be scaled up based on a scaling factor. In an example where the areas are 2 pixels wide by 2 pixels high in the first iteration and the size of the areas is doubled with each iteration (relative to the initial size of the image), the number of iterations could be calculated as the base 2 logarithm of a largest dimension of the image.

If the condition of operation 550 is not met, another iteration of the image processing subprocess will be performed. The process proceeds to operation 560, where the scale at which the blur will be applied is changed. As one example, this can be done by setting a larger size (in pixels) for each of the areas that will be defined at operation 520, such as by doubling the width and height of each area. If the width and height of each area are doubled, the number of areas in the next iteration of the image processing subprocess will decrease by approximately 75 percent relative to the previous iteration of the image processing subprocess, with the decrease being approximate as a result of rounding errors. As another example, this can be done by scaling down the image and using the same pixel size for the areas. In this example the image is downsampled by half in the width and height dimensions while the pixel-wise size of the areas remains the same, with the result being that each area represents a larger portion of the image that in the previous iteration. This will result in a 75 percent decrease in the number of areas relative to the previous iteration of the image processing subprocess, with the decrease being approximate as a result of rounding errors. The downsampled copy of the image would subsequently be upsampled when generating the final output image. This type of implementation reduces the complexity of the computations to be performed in each iteration and implicitly blurs the image by downscaling and later upscaling the image. In both of these examples, the plurality of areas defined at operation 520 is largest in a first iteration of the image processing subprocess, and the number of areas decreases with each subsequent iteration.

Subsequent to operation 560, the process returns to operation 520 where an additional iteration of the image processing subprocess commences.

If the condition of operation 550 is met, no further iterations of the image processing subprocess are performed, and the process advances to operation 570. In operation 570, an output image is generated, such as the output image 440. The output image 440 combines the results of the image processing performed in each iteration of the of image processing subprocess. If any of the images are downsampled images, they are upsampled to the original size of the input image prior to being combined.

The images resulting from each iteration are combined such that portions of the image that are identified in each iteration as including edges are retained and incorporated in the final image and other portions of the image are blurred. Thus, features from the image are retained from the iteration with the smallest area size (relative to the original size of the image) for which an edge feature is present. In this manner, edge features are retained in the output image 440 while applying blur to the remainder of the image at the largest size possible that will not result in a loss of edge features.

By way of example, the output image 440 can be generated by starting with a blurred copy of the image from the final iteration, at which the largest scale blur was applied. For any areas of the image that were determined to have edge features, those areas are incorporated from the previous iteration, at which a lesser degree of blur was applied. Thus, edge features are retained from the iteration in which their respective area was first identified as including edge features, and at smallest area size where they were first identified as including edge features.

Figure 6:
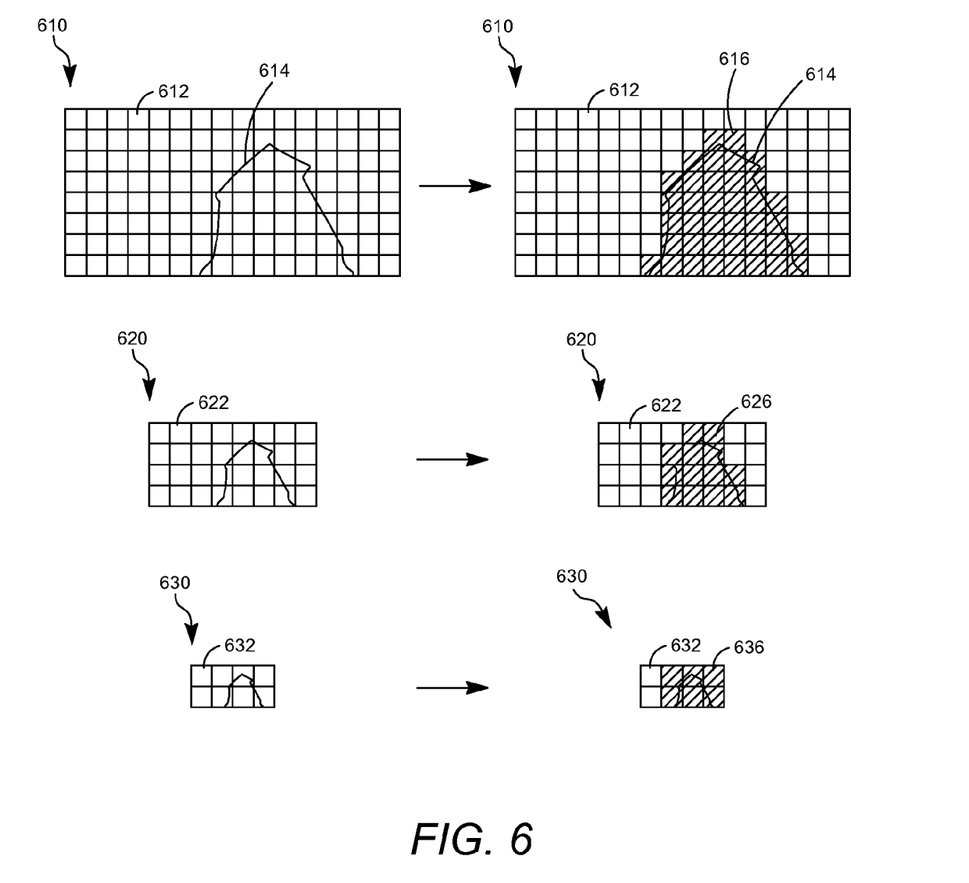
FIG. 6 is an illustration showing a first example of dividing an image into areas and detecting edge features in the areas.

FIG. 6 is an illustration showing a first example of dividing an image into areas and detecting edge features in the areas. In this example, the image is downsampled for each iteration of the edge detection and blur operations, and dividing the image into a plurality of areas is performed using a constant area size for the first iteration and each subsequent iteration.

A first generation image 610 is divided into a first number of areas 612 that each include a certain number of pixels. For example, each area can be two pixel by two pixel square. Other sizes and geometries can be used for the areas. The first generation image includes one or more high detail features 614. As a result of the edge detection operation, such as a threshold applied to the minimum and maximum pixel values in each of the areas 612, some of the areas 612 are identified as edge features areas 616 (indicated by hatching). When the final output image is created, the edge feature areas 616 from the first generation image will be included, will other portions of the image will be represented by portions of later-generation images. The first generation image 610 is downsampled to define a second generation image 620 which is divided into areas having the same pixel size as in the area 612 of the first generation, but representing a larger area of the original image. Thus, there are a smaller number of areas 622 in the second generation that the number of the areas 612 in the first generation. Edge feature areas 626 are identified in the second generation image in the manner previously described. In the output image, the image information from the second generation image 620 will be used for those portions of the image that were identified as having edge features in the second generation image 620, but not in the first generation image 610. The second generation image 620 is downsampled to define a third generation image 630, which is divided into areas 632 of a further reduced number but at the same pixel size. Edge feature areas 636 are identified in the manner previously described, and can be incorporated in the final image, which is generated as previously described.

Figure 7:
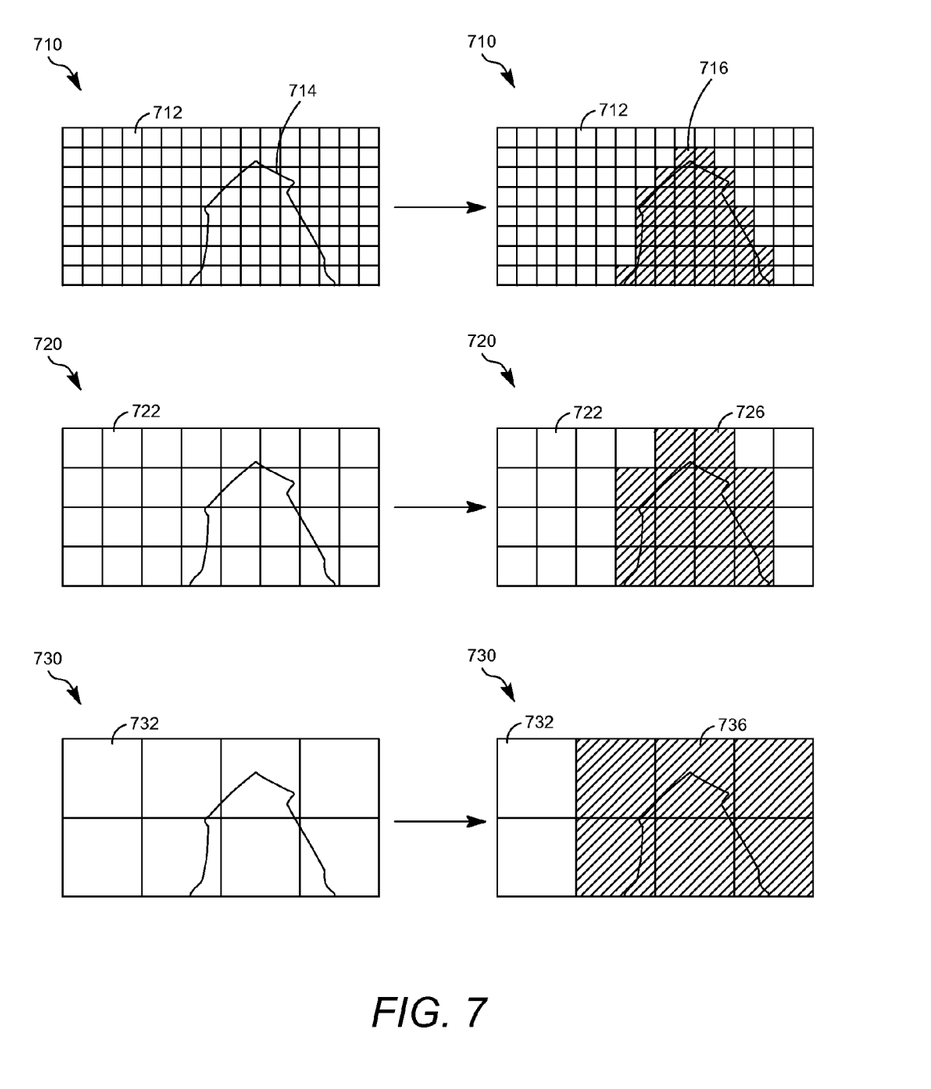
FIG. 7 is an illustration showing a second example of dividing an image into areas and detecting edge features in the areas.

FIG. 7 is an illustration showing a second example of dividing an image into areas and detecting edge features in the areas. This example is distinguishable from the example of FIG. 6 in that the images are not downsampled, but instead, the pixel width and pixel height of the areas is increased. Thus, in the example of FIG. 7, dividing the image into a plurality of areas is performed by using a first area size for the first iteration and increasing the area size for each subsequent iteration.

A first generation image 710 includes a first number of areas 712, and one or more high detail features 714. The areas 712 that include high detail features 714 are identified as edge feature areas 716. A second generation image 720 is the same width and height in pixels are the first generation image 710, but with a blur applied within each of the areas 712, as previously described. The second generation image 720 includes a smaller number of areas 722, each having a greater pixel size (e.g. width and height measured in pixels) as compared to the areas 712, and edge detection is applied to identify edge feature areas 726. A third generation image 730 is then generated based on the blurred second generation image 720, divided into areas 732 of smaller number but greater size, and edge detection is again applied to identify edge feature areas 736. The final image is created as previously described.

Figure 8:
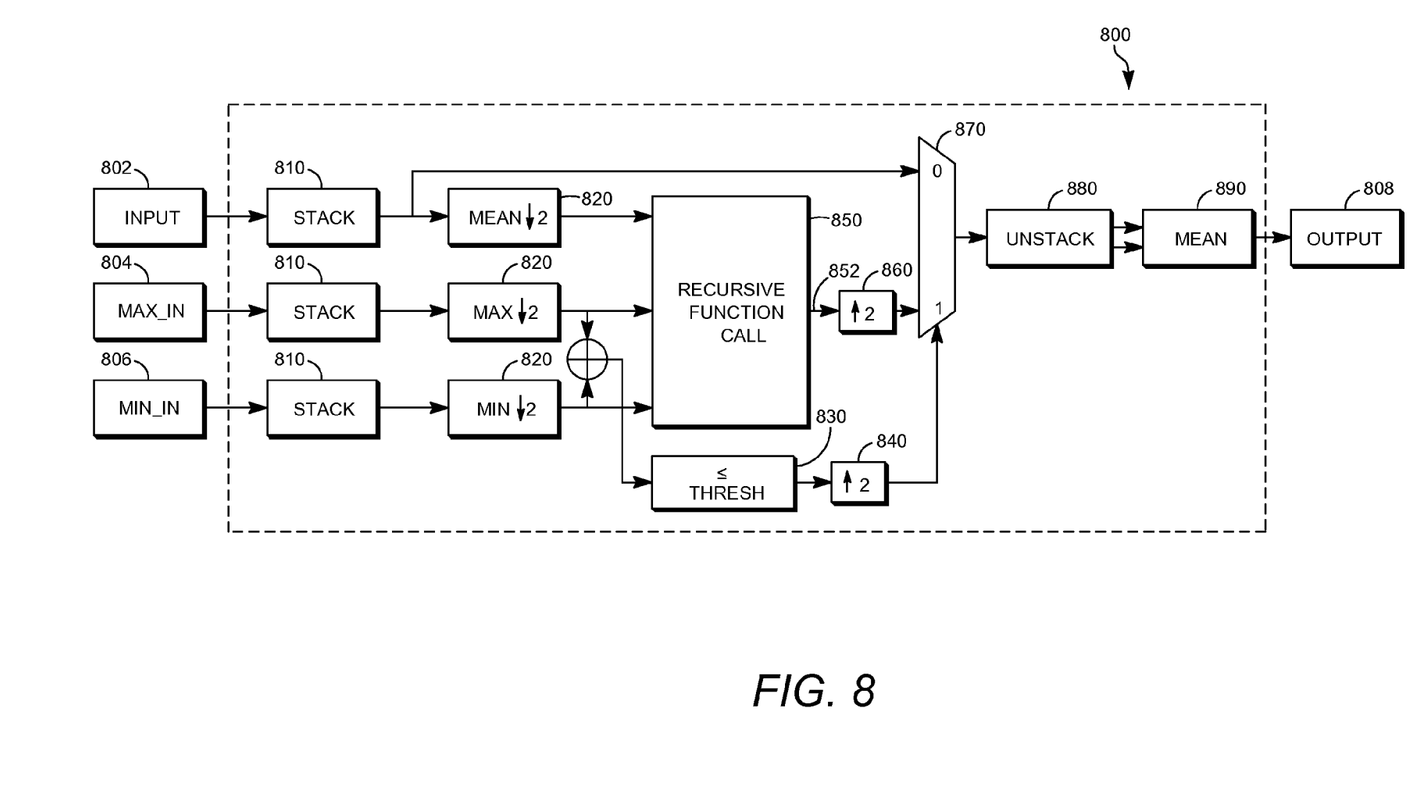
FIG. 8 is a block diagram showing an example of an image enhancement function for increasing color bit depth of images.

FIG. 8 is a block diagram showing an example of a function 800 for increasing color bit depth of images that performs iterations of edge detection and blurring in a recursive operation. The function 800 receives three images as input, which are denoted as input 802, max_in 804 and min_in 806. The function 800 generates and output image denoted as output image 808.

In a first iteration of the function 800 when the function 800 is called normally, the input 802, max_in 804, and min_in 806 are copies of a single input image. In subsequent iterations of the function 800 when it is called recursively, the input 802, max_in 804, and min_in 806 will each include distinct information.

When the function 800 is entered, a stacking operation 810 is performed with respect to each of input 802, max_in 804, and min_in 806. With respect to each of these images, the stacking operation 810 makes a copy of the image and places it adjacent to the original image, but with the copy having a one pixel diagonal shift. By doing this two copies of each of input 802, max_in 804, and min_in 806 will be processed concurrently, to allow filtering to subsequently be performed by simply averaging the original with the copy.

Next, a downscaling operation 820 is applied to each of input 802, max_in 804, and min_in 806. The downscaling operation 820 operates on groups of pixels in each image, thereby dividing each image into areas as previously described. For example, the downscaling operation 820 can divide each image into groups of pixels, calculate a single value for each group, such that the resulting downsampled version of the image will include one pixel corresponding to each group. The downscaling operation 820 can downscale input 802 by outputting an average value for each pixel group, downsample max_in 804 by outputting the maximum pixel value for each pixel group, and downsample min_in 806 by outputting the minimum pixel value for each pixel group.

The downsampled images for max_in 804 and min_in 806 are provided to an edge detection operation 830, which in this case compares the difference of max_in 804 and min_in 806 and compares that difference to a threshold to define an edge map that is upsampled in an upscaling operation 840 and passed as an input to an image combining operation 870.

The downsampled images for input 802, max_in 804 and min_in 806 are also provided to a recursive function call 850 which causes the function 800 to be called recursively. Recursive function calls 850 will continue for each iteration of the function 800 until a condition is met, as described with respect to operation 550 of the process 500. For example, a desired number of iterations can be set as a variable that is passed to the function 800 when it is called, and this variable can be decremented for each generation until the desired number of iterations have been performed, at which point the function 800 will be concluded without an additional instance of the recursive function call 850.

The result of the recursive function call 850 is an output image 852 from the recursive instance of the function, which is generated in the same manner as described with respect to the output image 808 as a result of completion of the function 800. The output image 852 is passed to an upscaling operation 860, with the upscaled output image from the recursive function call 850 being provided to the image combining operation 870.

The image combining operation 870 combines the stacked version of the input 802 with the upscaled output image from the recursive function call 850. These images are combined using the edge map. For each area of the image, the corresponding area from the input 802 is kept if an edge feature is present (e.g. the difference of max_in 804 and min_in 806 is not less than a threshold, which can be represented as a zero in the edge map) and the corresponding area from the output image from the recursive function call 850 is kept if an edge feature is not present (e.g. the difference of max_in 804 and min_in 806 is less than a threshold, which can be represented as a one in the edge map).

The combined image created by the image combining operation 870 is provided to an unstacking operation 880, which separates the two stacked copies that were created in the stacking operation 810 into two separate images, which are averaged in an averaging operation 890, thereby filtering the image to remove artifacts, and resulting in the output image 808. As a result of the blurring performed by the combination of the downscaling operations 820 and the subsequent upscaling operation 860, the pixels values in the output image 808 can be expressed at a higher color bit depth than used for input 802.

The stacking operations 810, the unstacking operation 880, and the averaging operation 890, in combination, perform a filtering operation in parallel with bit depth enhancement, as explained with respect to the filtering subsystem 430. The function 800 can be used without filtering, in which case, the stacking operations 810, the unstacking operation 880, and the averaging operation 890 would be omitted.

In the description above, the stacking operations 810 each result in a single pixel-shifted copy being stacked with the original image, and the unstacking operation 880 results in two images that are then averaged at the averaging operation 890. The number of copies that are stacked with the original image can be modified, and filtering operations that involve more than one copy of the image are explicitly contemplated. For example, three copies could be stacked with the original image, with the original image being unshifted, a first copy being shifted horizontally by one pixel, a second copy being shifted vertically by one pixel, and a third copy being shifted diagonally by one pixel.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 110 and/or receiving station 120 (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 110 and receiving station 120 do not necessarily have to be implemented in the same manner.

The transmitting station 110 and/or the receiving station 120 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for processing an image having a first bit depth:
    performing two or more iterations of a bit depth enhancement operation that increases the bit depth of the image to a second bit depth that is higher than the first bit depth, the bit depth enhancement operation including:
        dividing the image into a plurality of areas,
        performing an edge detection operation to identify one or more areas from the plurality of areas that do not contain edge features, and
        applying a blur to the one or more areas from the plurality of areas that do not contain edge features,
    wherein, in a first iteration of the of the bit depth enhancement operation, the plurality of areas includes a first number of areas, and the number of areas included in the plurality of areas decreases with each subsequent iteration of the bit depth enhancement operation.

2. The method of claim 1, wherein the number of areas included in the plurality of areas decreases by approximately 75 percent with each subsequent iteration of the bit depth enhancement operation.

3. The method of claim 1, wherein dividing the image into a plurality of areas is performed using a constant area size for the first iteration and each subsequent iteration.

4. The method of claim 1, wherein dividing the image into a plurality of areas is performed by using a first area size for the first iteration and increasing the area size for each subsequent iteration.

5. The method of claim 1, wherein each area from the plurality of areas includes a plurality of pixels each having a pixel value, and the edge detection operation includes comparing a maximum pixel value in each area to a minimum pixel value in each area.

6. The method of claim 5, wherein an edge feature is identified when the difference between the maximum pixel value and the minimum pixel value in a respective area from the plurality of areas exceeds a threshold value.

7. The method of claim 1, wherein each area from the plurality of areas includes a plurality of pixels each having a pixel value and applying the blur includes averaging the pixel values in each of the one or more areas that do not contain edge features.

8. An apparatus for processing an image having a first bit depth, comprising:
    a memory; and
    a processor configured to execute instructions stored in the memory to:
        perform two or more iterations of a bit depth enhancement operation that increases the bit depth of the image to a second bit depth that is higher than the first bit depth, the bit depth enhancement operation including:
            dividing the image into a plurality of areas,
            performing an edge detection operation to identify one or more areas from the plurality of areas that do not contain edge features, and
            applying a blur to the one or more areas from the plurality of areas that do not contain edge features,
        wherein, in a first iteration of the of the bit depth enhancement operation, the plurality of areas includes a first number of areas, and the number of areas included in the plurality of areas decreases with each subsequent iteration of the bit depth enhancement operation.

9. The apparatus of claim 8, wherein the number of areas included in the plurality of areas decreases by approximately 75 percent with each subsequent iteration of the bit depth enhancement operation.

10. The apparatus of claim 8, wherein dividing the image into a plurality of areas is performed using a constant area size for the first iteration and each subsequent iteration.

11. The apparatus of claim 8, wherein dividing the image into a plurality of areas is performed by using a first area size for the first iteration and increasing the area size for each subsequent iteration.

12. The apparatus of claim 8, wherein each area from the plurality of areas includes a plurality of pixels each having a pixel value, and the edge detection operation includes comparing a maximum pixel value in each area to a minimum pixel value in each area.

13. The apparatus of claim 12, wherein an edge feature is identified when the difference between the maximum pixel value the minimum pixel value in a respective area from the plurality of areas exceeds a threshold value.

14. The apparatus of claim 8, wherein each area from the plurality of areas includes a plurality of pixels each having a pixel value and applying the blur includes averaging the pixel values in each of the one or more areas that do not contain edge features.

15. A non-transitory computer-readable storage device including program instructions executable by one or more processors that, when executed, cause the one or more processors to perform operations for processing an image having a first bit depth, the operations comprising:

performing two or more iterations of a bit depth enhancement operation that increases the bit depth of the image to a second bit depth that is higher than the first bit depth, the bit depth enhancement operation including:

dividing the image into a plurality of areas, performing an edge detection operation to identify one or more areas from the plurality of areas that do not contain edge features, and applying a blur to the one or more areas from the plurality of areas that do not contain edge features, wherein, in a first iteration of the of the bit depth enhancement operation, the plurality of areas includes a first number of areas, and the number of areas included in the plurality of areas decreases with each subsequent iteration of the bit depth enhancement operation.

16. The non-transitory computer-readable storage device of claim 15, wherein the number of areas included in the plurality of areas decreases by approximately 75 percent with each subsequent iteration of the bit depth enhancement operation.

17. The non-transitory computer-readable storage device of claim 15, wherein dividing the image into a plurality of areas is performed using a constant area size for the first iteration and each subsequent iteration.

18. The non-transitory computer-readable storage device of claim 15, wherein dividing the image into a plurality of areas is performed by using a first area size for the first iteration and increasing the area size for each subsequent iteration.

19. The non-transitory computer-readable storage device of claim 15, wherein each area from the plurality of areas includes a plurality of pixels each having a pixel value, and the edge detection operation includes comparing a maximum pixel value in each area to a minimum pixel value in each area.

20. The non-transitory computer-readable storage device of claim 19, wherein an edge feature is identified when the difference between the maximum pixel value and the minimum pixel value in a respective area from the plurality of areas exceeds a threshold value.

21. The non-transitory computer-readable storage device of claim 15, wherein each area from the plurality of areas includes a plurality of pixels each having a pixel value and applying the blur includes averaging the pixel values in each of the one or more areas that do not contain edge features.

* * * * *